(12) United States Patent
Otterbach et al.

(10) Patent No.: US 7,177,711 B2
(45) Date of Patent: Feb. 13, 2007

(54) INTERFACE MODULE

(75) Inventors: Jens Otterbach, Wenden (DE);
Hartmut Schumacher, Freiberg (DE);
Peter Taufer, Renningen (DE); Achim Henne, Sachsenheim (DE); Harald Tschentscher, Grossbottwar (DE);
Davor Lukacic, Bodelshausen (DE)

(73) Assignee: Robert Bosch GmbH, Stuttgart (DE)

( * ) Notice: Subject to any disclaimer, the term of this patent is extended or adjusted under 35 U.S.C. 154(b) by 611 days.

(21) Appl. No.: 10/094,563

(22) Filed: Mar. 8, 2002

(65) Prior Publication Data

US 2002/0163429 A1 Nov. 7, 2002

(30) Foreign Application Priority Data

Mar. 9, 2001 (DE) ................. 101 11 263

(51) Int. Cl.
*G05B 9/02* (2006.01)
*F02D 41/00* (2006.01)
*G06F 19/00* (2006.01)
*G06G 7/70* (2006.01)

(52) U.S. Cl. ............. 700/79; 123/691; 701/101
(58) Field of Classification Search ........... 700/79; 123/672–691; 250/343; 375/257; 60/272; 701/101
See application file for complete search history.

(56) References Cited

U.S. PATENT DOCUMENTS

| | | | |
|---|---|---|---|
| 3,943,284 A | 3/1976 | Nelson | |
| 5,760,489 A | 6/1998 | Davis et al. | |
| 6,037,592 A * | 3/2000 | Sunshine et al. | 250/343 |
| 6,163,578 A * | 12/2000 | Seibold et al. | 375/257 |
| 6,371,097 B1 * | 4/2002 | Rossi | 123/691 |

FOREIGN PATENT DOCUMENTS

| | | |
|---|---|---|
| DE | 36 87 621 | 6/1993 |
| DE | 295 13 552 | 11/1995 |
| DE | 195 11 140 | 10/1996 |
| EP | 0 982 159 | 3/2000 |

OTHER PUBLICATIONS

"IEEE 100 The Authoritative Dictionary of IEEE Standards Terms", p. 610, 7th edition, Dec. 2000, 3 pages.*
E. Lugscheider et al., "Characterization of the quality of brazed joins and of the strength of high-temperatue-brazed joints as a function of important brazing parameters", Essen 21, Sep. 22, 1981, pp. 100-106. (Abstract).

* cited by examiner

*Primary Examiner*—Anthony Knight
*Assistant Examiner*—Sunray Chang
(74) *Attorney, Agent, or Firm*—Kenyon & Kenyon LLP

(57) ABSTRACT

An interface module is proposed, to which sensors are connected and which is positioned in a control device, it being indicated via an identification input how the sensor data are to be classified by the interface module. In particular, this can be used to distinguish between safety-relevant and safety-irrelevant data. Furthermore, the nature of the data can be identified therewith. This identification input is advantageously designed as a voltage input, the voltage levels being then converted into a bit sequence. The identification input is connected to ground via a resistor, so that, in the case of an unspecified input potential, the voltage level is connected to ground. The interface module has a logic circuit to which voltage comparators are connected, which compare the voltages to reference potentials, and then the logic circuit performs a coding using the bit sequences, as a function of the output signals of the voltage comparators.

7 Claims, 1 Drawing Sheet

INTERFACE MODULE

FIELD OF THE INVENTION

The present invention relates to an interface module.

BACKGROUND INFORMATION

It is known that one can connect sensors to an interface module of a control device for restraint systems, the interface module in the control device being connected to a processor to which the sensor data are then transmitted by the interface module.

SUMMARY OF THE INVENTION

By contrast, the interface module according to the present invention has the advantage that the sensor data can be qualitatively classified by the at least one identification input of the interface module according to the present invention, i.e. as to what kind the data are. In this connection, the question arises especially as to how relevant to safety the sensor data are. This increases the robustness and reliability of a system in which an interface module plays a part. This is of advantage especially for a restraint system.

For example, the differentiation between sensor data from an acceleration sensor and a pressure sensor can then be achieved by different voltage levels. This differentiation can also be inserted as a redundant identification in addition to the identification in the data messages which are transmitted from the sensors to the interface module.

It is of particular advantage that the identification input is designed as a voltage input, the identification of the respective sensor taking place via a respective voltage level. As an example, for peripherally positioned acceleration sensors, a voltage level of 5 volt is used; for pressure sensors, which are used especially for sensing side collisions, a voltage level of 3.3 volt is used; and for data which are not relevant to safety, a voltage level of 0 volt is used. The voltage levels are made available in the control device, and are therefore preset permanently by the manufacturer of the control device.

Here it is especially of advantage that the voltage input has a so-called pull-down resistance which connects the input to ground, so as, in case of an error, such as a line interruption to the identification input, to set the input to a specified voltage potential, which means ground here. This increases the reliability of the identification input according to the present invention.

It is further of advantage that the voltage levels are converted into bit sequences with the aid of voltage comparators and a logic circuit following the voltage comparators, for the purpose of classifying the data from the sensors in a unique manner, using the bit sequence.

Beyond that, it is of advantage that the interface module and the processor are positioned in a control device and that the control device is possibly connected to a restraint device via a firing circuit control, the communication between the interface module and the processor being guided through the SPI (serial peripheral interface) line.

DETAILED DESCRIPTION

In the course of the further refinement of sensor concepts in complex systems, various sensing concepts are implemented. Furthermore, a variation of the sensitivity of sensors is used. The recognizability of the measuring quantity and its meaning is desirable for this. With this, then, an adequate implication can be assigned to the relevance of the respective measuring quantity. Thereby the whole system further receives additionally a greater choice of criteria, with the aid of which better regulation of safety modules and actuators can be supported.

According to the present invention, the interface module, to which at least one sensor can be connected, is now provided with at least one identification input, in order to achieve the classification of the data of the respective sensors. Then, independently of the data messages by which the sensor data are transmitted to the interface module, it can be recognized, with the aid of the signal at the identification input, of what kind the sensor data are.

More advantageously, this identification input is designed as a voltage input, so that one can then identify the voltage present, using voltage comparators, by making a comparison to reference voltages. By using a so-called pull-down resistor at the identification input, one can achieve that, in the case of an undefined input, for example, during an interruption, the voltage is set to ground, so that a defined potential is always present at the voltage input.

Figure 1:
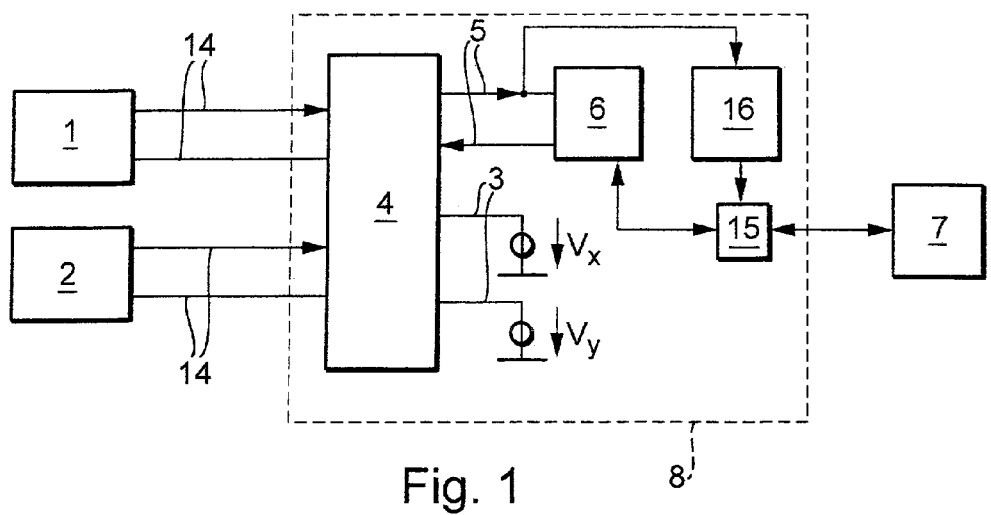
FIG. 1 shows a first block diagram of the interface module according to the present invention which is connected to various components.

FIG. 1 shows an interface module connected to sensors and to a processor. Here, an interface module 4, a line 5, a safety module 16, a firing circuit control, lines 3 and voltage sources Vx and Vy, as well as a processor 6 are components of a control device B. Sensors 1 and 2 are connected to interface module 4 respectively via two-wire leads 14. Interface module 4 is connected to processor 6 via an output line and an input line 5. Voltage sources Vx and Vy are connected to the respective identification inputs for sensors 1 and 2 to interface module 4 via leads 3. Furthermore, a safety module 16 is connected to line 5, and it checks the sensor values without software to determine whether restraint device 7 is to be released. Thus, safety module 16 is an algorithm molded into hardware. Processor 6 is connected to firing circuit control 15 via a data input/output, to which safety module 16 is also connected via a data input.

Firing circuit control 15 is connected to restraint device 7 via a second data input/output. Firing circuit control 15 releases restraint device 7 only when both processor 6 and its release algorithm and the safety module each recognize a release-relevant situation independently of each other with the aid of sensor data. Voltages Vx and Vy are supplied by a supply module, not shown here, of control device 8.

Sensors 1 and 2 are here peripherally positioned acceleration sensors (PAS=peripheral acceleration sensor). Leads 14 here are current leads by which the sensor is supplied with electrical energy from interface module 4 by a constant current level, and the sensors transmit their data messages to this current level by current fluctuations to interface module 4. The data messages which here are 11 bits long are coded in Manchester coding.

The type of data from sensors 1 and 2 is signaled via voltage leads 3. Thereby, a classification of the sensor data can be achieved via the voltage level by interface module 4. In particular, interface module 4 is thereby in a position to differentiate between safety-relevant and irrelevant sensor data. Interface module 4 then converts the sensor data into appropriate data messages for transmission to processor 6 and safety module 16. To do that, interface module 4 uses SPI lead 5.

Figure 3:
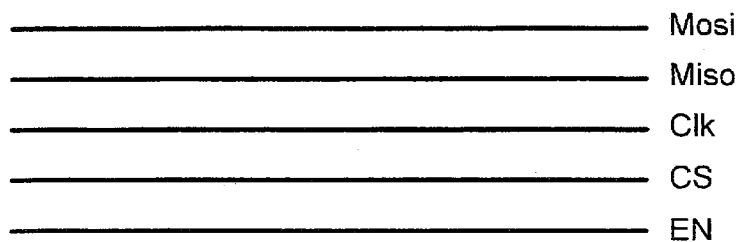
FIG. 3 shows an SPI line.

SPI (serial peripheral interface) transmission is data transmission between a master, a processor and several slaves, which are the individual components in a control device such as the interface module according to the present invention, or a firing circuit control which is used for monitoring and firing the igniters for the restraint device. The SPI transmission is a bidirectional and synchronous transmission. FIG. 3 shows an SPI line which itself has five individual lines. Since we are talking about synchronous transmission, a timing circuit denoted as Clk is present. For data transmission from a master to a slave there is a MOSI (master-out-slave-in) line, but for data transmission from a slave to a master, a MISO (master-in-slave-out) line is present. In order to select the appropriate slave, the CS (chip select) line is used. In order to release the SPI data transmission, an enable line, here denoted as EN, is used. The SPI line starts at the master and then branches out to the individual slaves, the SPI line, however, always having the five single lines.

Processor 6 then calculates its release algorithm, in order to check whether the sensor values signify a triggering case for restraint system 7. In this connection, the sensor values are compared to threshold values which are changeable as a function of the sensor values. Thus, this is about adaptive threshold values. Safety module 16, on the other hand, calculates a more simple triggering algorithm. If a triggering case occurs, which is recognized both by processor 6 and by safety module 16, then processor 6 controls restraint device 7, for instance, air bags or belt tighteners, via firing circuit control 15, safety module 16 releasing firing circuit control 15.

It is possible for more or fewer sensors to be present than the two represented here. It is particularly possible to have pressure or temperature sensors connected, the nature of the sensor values being transmitted to interface module 4 then being identified via the voltage levels.

Figure 2:
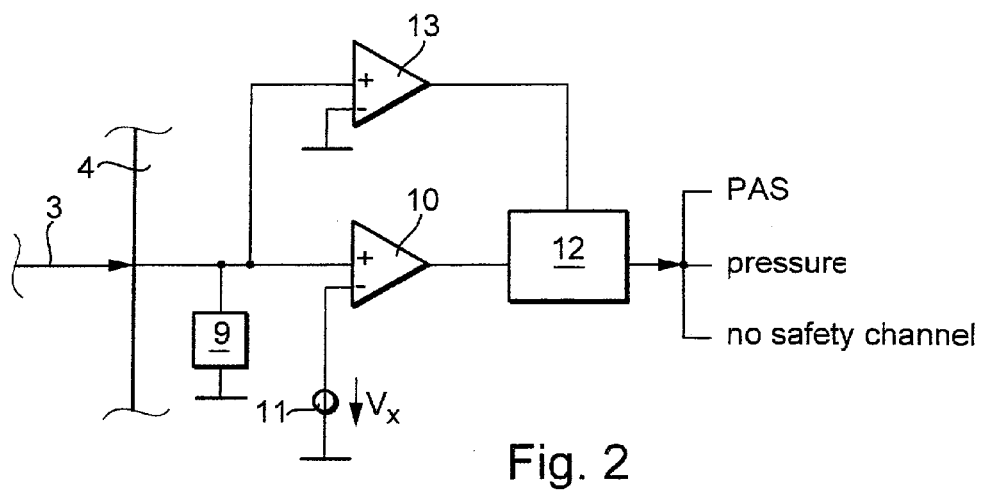
FIG. 2 shows a circuit diagram of the identification input according to the present invention.

FIG. 2 shows as a circuit diagram the identification input of interface module 4 according to the present invention. Thus, lead 3 goes to interface module 4. A resistor 9 is connected to ground at the input to which line 3 goes. In this case, resistor 9 is used as a pull-down resistor. With this it is achieved that, at an interruption of line 3, the specified ground potential is present at the input of the identification input. Thereby it is avoided that one would wrongly reach a non-intended and potentially dangerous classification of sensor data caused by an unspecified potential. The voltage level present on line 3 is represented by voltage comparators 10 and 13 respectively at their positive input with reference potentials Vx voltage source 11, and the ground potential is compared at comparator 13. As a function of this comparison, voltage comparators 10 and 13 each transmit a signal to a logic circuit 12, which generates a bit sequence, as a function of these signals, which then uses the voltage level for a classification of the sensor data. The bit sequence 01 is used here as the bit sequence for peripheral acceleration sensors 1 and 2, 5 volt having been the voltage level present. For a pressure sensor a voltage level of 3.3 volt is used, and a bit sequence 10. A voltage level of 0 volt and a bit sequence of 00 are used for a different data channel.

Processor 6 then receives the bit sequence, and then determines the classification of the received sensor data as a function of the bit sequence which codes the kind of sensor data. This is also carried out in parallel in safety module 16.

The number of voltages can be broadened, the bit sequence also having to be lengthened so as to code the corresponding variants. That depends on how many different data sources, i.e. sensors, are connected to interface module 4. Each voltage is then connected to its own identification input at the interface module. In this connection, the identification input is assigned to a data line, so that a unique identification of the data is possible.

What is claimed is:

1. An interface module, comprising:
   at least a first connection that is connectible to at least one sensor across at least one first lead;
   a second connection that is connectible to a processor for transmitting data received from the at least one sensor to the processor via at least one second lead;
   an identification input for each respective one of the at least one sensor, each identification input being coupled to a voltage source via a dedicated third lead, the identification input receiving a signal from the voltage source for identifying a type of data received from the at least one sensor; and
   an arrangement for transmitting at least one data message, based on the identification input, to the processor across the second connection, wherein the interface module and the processor are capable of being positioned in a control device and the control device is connectible to a restraint device capable of being released.

2. The interface module according to claim 1, wherein:
   the identification input includes a voltage input,
   an identification of each respective one of the at least one sensor is performed via a respective one of a plurality of voltage levels, and the plurality of voltage levels is made available in a control device.

3. The interface module according to claim 2, further comprising:
   a resistor to ground positioned at the identification input.

4. The interface module according to claim 2, further comprising:
   a logic circuit; and
   at least one voltage comparator connected to the logic circuit and for converting the voltage levels into a bit sequence that classifies the data.

5. The interface module according to claim 1, wherein:
   the second connection includes an SPI line for connection to the processor.

6. The interface module according to claim 1, wherein:
   the data from the at least one sensor is transmitted based on current fluctuations; and
   the identification input is transmitted based on voltage levels.

7. The interface module of claim 1, wherein the sensor is a peripherally positioned acceleration sensor.

* * * * *